3,243,401
POLYMER LATICES
John D. Floyd, Wilmington, Del., assignor to Hercules Powder Company, Wilmington, Del., a corporation of Delaware
No Drawing. Filed Nov. 1, 1961, Ser. No. 149,178
8 Claims. (Cl. 260—29.7)

This application is a continuation-in-part of my U.S. application Serial No. 858,846, filed December 11, 1959, now abandoned.

This invention relates to latices of polymers containing epoxide groups and to a process for producing such latices by epoxidizing a polymer of a diene in latex form.

It is well known to the art to epoxidize unsaturated organic compounds. In particular, it is well known to epoxidize unsaturated polymers of a conjugated diene with organic peracids, e.g., peracetic acid, perbenzoic acid, etc., in an organic solvent medium as disclosed in U.S. 2,842,513 and 2,875,178. Such reactions of an organic peracid with an olefinic compound to produce an epoxy (oxirane) compound may be illustrated as follows:

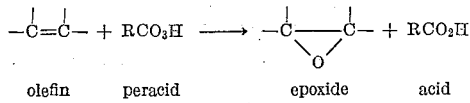

olefin    peracid    epoxide    acid

Until the present time the application of this reaction has been limited because it was thought that the reaction of the diene polymer with a peracid had to be carried out in liquid phase, i.e., that the starting material had to be either a liquid or in solution in a suitable solvent. This necessitated a limit on the molecular weight of the polymer since the higher molecular weight polymers are solids of little or no solubility in organic solvents. Also, since diene polymers are most commonly prepared via emulsion polymerization, in these cases it was necessary to isolate the polymer and dissolve it in a suitable organic solvent before it could be epoxidized.

The present invention is based on the discovery that, contrary to previous beliefs, it is possible to epoxidize an unsaturated polymer of a conjugated diene in the latex, or emulsion, state, i.e., the state in which the polymer is dispersed or emulsified in an external aqueous phase, to produce a latex of a polymer containing epoxide groups, provided that the latex is nonionic, i.e., one prepared with a nonionic emulsifying agent or a mixture of emulsifying agents in which nonionic agents predominate. The invention thus provides numerous advantages including the facts that there is no limit on the molecular weight of the polymer to be epoxidized and that epoxidation takes place in the medium in which the polymer is normally prepared without changing the physical state of the polymer.

Accordingly, the invention relates to a latex of an epoxidized polymer of a conjugated diene, said epoxidized polymer having an epoxide equivalent weight of from about 2000 to about 200; and to the process of preparing the same comprising adding an organic peracid to a nonionic latex of an unsaturated polymer of a conjugated diene to form oxirane groups in the polymer. The term "epoxide equivalent weight" means the weight of polymer in grams per

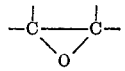

group.

Before describing the invention in greater detail, the following examples are presented for purposes of illustration, parts and percentages being by weight unless otherwise specified.

EXAMPLE 1

Three hundred (300) parts of a latex (48% solids) containing a 40% butadiene–60% styrene copolymer (molecular weight greater than 50,000) and 6 parts sorbitan monostearate (nonionic emulsifying agent) were placed in a 3-necked flask equipped with a stirrer, reflux condenser and dropping funnel. Into the dropping funnel was placed 43.5 parts of a sodium acetate-buffered 40% peracetic acid solution in acetic acid. The peracid solution was added dropwise to the stirred latex over a 10-minute period. The reaction was allowed to proceed at 35° C. for a total period of 3 hours. The product was dialyzed across a cellulosic membrane against the tap water until all the acetic acid by-product was removed (about 18 hours). The product was analyzed and found to contain 1.86% oxirane oxygen based on the solids, giving a product with an epoxide equivalent weight of 860. Conversion of peroxygen to oxirane oxygen was 78%. The particle size and mechanical stability of the product were equivalent to the parent latex.

EXAMPLE 2

One thousand (1000) parts of the latex polymer described in Example 1 stabilized with 19.2 parts of a partial palmitic acid ester of polyethylene oxide (nonionic emulsifying agent) was treated with 145 parts of a sodium acetate-buffered 40% peracetic acid solution in acetic acid, as in Example 1. The product was analyzed and found to contain 2.03% oxirane oxygen based on the solids, from which an epoxide equivalent weight of 792 was calculated. The product was distilled at 40° C. in a rotary vacuum stripper to remove the by-product acetic acid. After stripping, the oxirane oxygen content was the same as before and remained unchanged after 2 weeks storage at room temperature. The particle size and mechanical stability of the product were equivalent to the parent latex.

To 90 parts of the epoxidized latex product was added 10 parts of urea-formaldehyde resin. After mixing, this composition was cured for ½ hour at 150° C. as a film on glass. The cured product was tested and found to have a Sward hardness of 30. The product was clear and insensitive to both water and organic solvents. A film of the unmodified latex polymer on glass had a Sward hardness of only 4 and was quite sensitive to both water and acetone.

From the above it can readily be seen that hard, water and organic solvent-resistant films can be prepared from the epoxidized latex product and a curing agent.

EXAMPLE 3

Three hundred (300) parts of a latex (48% solids) containing a 33% butadiene–67% styrene copolymer (molecular weight greater than 50,000) and emulsified with 6 parts diethylene glycol monopalmitate (nonionic emulsifying agent) was treated with 90 parts of a sodium acetate-buffered 40% peracetic acid solution in acetic acid as in Example 1. The product was dialyzed across a cellulosic membrane against tap water until all the acetic acid by-product was removed. The product was analyzed, and found to contain 2.70% oxirane oxygen thereby having an epoxide equivalent weight of 590.

To 95 parts of the epoxidized product was added 5 parts of melamine-formaldehyde resin. After mixing, the composition was cured for 15 minutes at 150° C. as a film on glass. The resulting clear film was tested and found to have a Sward hardness of 51. The film was insensitive to toluene, and practically insensitive to acetone and water. A film of the same latex polymer, unmodified, had a Sward hardness of only 10, whitened and softened on contact with water and partially dissolved in toluene.

EXAMPLE 4

Two hundred and fifty (250) parts of a latex (21% solids) containing a 50% butadiene-50% styrene copolymer (molecular weight greater than 50,000) and 2.1 parts of the sodium soap of hydrogenated rosin (anionic emulsifying agent) were placed in a 3-necked flask equipped with stirrer, reflux condenser and dropping funnel. Into the dropping funnel was placed 30 parts of a sodium acetate-buffered 40% peracetic acid solution in acetic acid. The peracid solution was added dropwise to the stirred latex at a temperature of 35° C. The latex coagulated after the first few drops of the peracid, thus showing that the emulsion must be one prepared with a predominantly nonionic emulsifying agent.

EXAMPLE 5

To 100 parts of a latex (40.6% solids) containing a 33% acrylonitrile–67% butadiene copolymer (molecular weight greater than 50,000) and 2 parts of sorbitan monolaurate (nonionic emulsifying agent) were added 25 parts of a sodium acetate-buffered 40% peracetic acid solution in acetic acid at a temperature of 45° C. over a period of 10 minutes. The reaction mixture was kept at 45° C. for 45 minutes, then cooled to room temperature and neutralized with sodium hydroxide. The product was analyzed and found to contain 2.2% oxirane oxygen based on the solids, giving a product with an epoxide equivalent weight of 730. Conversion of peroxygen to oxirane oxygen was 43%. The particle size and mechanical stability of the product were equivalent to the parent latex.

EXAMPLE 6

To 100 parts of a latex (44% solids) containing a 50% α-methylstyrene-50% butadiene copolymer (molecular weight greater than 50,000) and 2.2 parts of the polyethylene oxide adduct of lauryl alcohol (nonionic emulsifying agent) were added 25 parts of a sodium acetate-buffered 40% peractic acid solution in acetic acid. The epoxidation was carried out as in Example 5 except that instead of neutralizing the by-product acetic acid, it was removed by dialysis. The product was analyzed and found to contain 1.7% oxirane oxygen based on the solids, giving a product with an epoxide equivalent weight of 930. The particle size and mechanical stability of the product were equivalent to the parent latex.

EXAMPLE 7

To 100 parts of a latex (40% solids) containing a 53% α-methylstyrene-47% butadiene copolymer (molecular weight greater than 50,000) and 5.65 parts of the polyethylene oxide adduct of lauryl alcohol were added 25 parts of a sodium acetate-buffered 40% peracetic acid solution in acetic acid. The reaction mixture was kept at 45° C. for 75 minutes, then cooled to room temperature and dialyzed as described in Example 3. The product was analyzed and found to contain 3.71% oxirane oxygen based on the solids, giving a product with an epoxide equivalent weight of 430.

The epoxidized latex product was tested as a paper saturant as follows:

Handsheets were prepared using beaten bleached kraft pulp of 600 freeness. The wet handsheets still supported on the wire were immersed for 30 seconds at room temperature in the above described latex to which had been added 5% maleic anhydride curing agent based on the weight of the copolymer. The wet sheets were passed through a laboratory padder at a nip pressure of 40 p.s.i. and then drum-dried for 4 minutes at 138° C. For purposes of comparison handsheets were prepared in the exact same way except instead of immersing in the epoxidized latex, they were immersed in a commercial 55% butadiene–45% acrylonitrile copolymer latex (42.5% solids). Control handsheets were also prepared which were not immersed in any latex. The handsheets immersed in the latices each had 15% add-on. Percent add-on was calculated by the formula:

$$\text{Percent add-on} = \frac{\text{wt. of saturant}}{\text{wt. of saturant} + \text{wt. of paper}} \times 100$$

The porosity, abrasive resistance, and tensile strength of the handsheets are compared in Table I.

Table I

| | Control | Poly(butadiene-acrylonitrile) Latex | Epoxidized Latex |
|---|---|---|---|
| Dry tensile strength (lbs./inch) | 22 | 15.2 | 26.4 |
| Water-wet tensile strength (lbs./inch) | 0.75 | 1.53 | 8.33 |
| Water-wet tensile strength after 4 hours' extraction with xylene (lbs./inch) | 0.73 | 3.67 | 9.53 |
| Dry tensile strength after 6 hours' extraction with perchloroethylene (lbs./inch) | 22 | 18.4 | 26.4 |
| Water-wet tensile strength after 6 hours' extraction with perchloroethylene (lbs./inch) | 0.74 | 3.5 | 11.7 |
| Water-wet abrasive resistance, determined on a Taber Abraser (cycles to failure) | 4 | 19 | 70 |
| Dry porosity [1] | 208 | 135 | 309 |

[1] The number of seconds required to pass 1 cc. of air through the paper in the standard Turley Porosity Tester.

EXAMPLE 8

To 100 parts of a latex (46% solids) containing a 67% styrene-33% butadiene copolymer (molecular weight 750,000) and 0.4 parts of a polyoxyethylene sorbitol lanolin derivative (nonionic emulsifying agent) were added 30 parts of a sodium acetate-buffered 40% peracetic acid solution in acetic acid at a temperature of 46° C. over a period of 40 minutes. The product was dialyzed across a cellulosic membrane against tap water for 16 hours. Then the product was analyzed and found to contain 3.4% oxirane oxygen based on the solids, giving a product with an epoxide equivalent weight of 470.

The epoxidized latex product was tested as a binder for nonwoven fabric as follows:

Sheets of nylon webbing, prebonded with polyvinyl alcohol and prepared from 3 denier, 2 inch fibers cross laid in two layers, were saturated by padding on the above described latex to which had been added 5% maleic anhydride curing agent based on the weight of the copolymer. The percent wet add-on was calculated to be 100. The sheets were dried at a temperature of 60° C. in a circulating air oven and then cured at a temperature of 150° C. for 5 minutes. For purposes of comparison, sheets of the same nylon prebonded webbing were treated with the commercial latices. The commercial latices used were a 55% butadiene–45% acrylonitrile copolymer latex (42.5% solids) and a 33% styrene–67% butadiene copolymer latex (45% solids). Each sheet was saturated to 100% wet add-on, dried and then cured. A sulfur and zinc oxide curing mixture was used to cure each commercial latex. The sheets bound with butadiene-acrylonitrile copolymer latex were cured for 20 minutes at a temperature of 120° C. The sheets bound with styrene-butadiene copolymer latex were cured for 15 minutes at a temerature of 100° C. The tensile strength of the various treated nylon sheets before and after dry cleaning is compared in Table II.

Table II

| Binder | Tensile strength, lbs./inch | Tensile strength after dry cleaning [1] |
|---|---|---|
| Epoxidized latex | 32 | 42 |
| Poly(styrene-butadiene) latex | 22 | 18 |
| Poly(butadiene-acrylonitrile) latex | 11 | 14 |

[1] The sheets were tumbled for ½ hour in a hydrocarbon type dry cleaning solution and then allowed to dry.

As demonstrated in the examples, unsaturated polymers of conjugated dienes that are in the form of nonionic latices can be epoxidized to latices of polymers containing epoxide groups which are especially useful as paper saturants and binders in nonwoven fabrics.

The polymers, whose latices are employed in the invention can be any unsaturated addition polymer or copolymer of a conjugated diene, i.e., a compound containing conjugated

linkages. Preferred polymers are polybutadienes, and the copolymers of a butadiene with monoolefins such as butene, styrene, methylstyrene, acrylonitrile, methacrylonitrile, esters of acrylic and methacrylic acid, vinyl chloride, etc. Other polymers such as polyisoprene, natural rubber, poly(vinyl cyclohexene) copolymers of isoprene or vinyl cyclohexene with any of the aforesaid monoolefin compounds, etc., can also be used, the only criterion being that the polymers contain residual olefinic linkages as reactive sites for epoxidation. Contrary to the prior art methods of epoxidation, the molecular weight of the polymer need not be limited, polymers having any molecular weight being useful in the process of the invention.

The conjugated diene addition polymer is used in the form of a latex containing a saturated, nonionic emulsifying agent either of the water-dispersible or water-soluble type. The water-dispersible type of nonionic emulsifying agent is typically an ester of sorbitol, sorbitan, mannitol, mannitan, polyglycerol or certain medium length chain polyethylene glycols. The water-soluble type of nonionic emulsifying agent is typically an ester of a long chain polyethylene glycol, a partial ester of a highly polymerized glycerol, a hydroxy alkyl ether of glycerol, sorbitol or mannitol or an ethylene oxide adduct of a phenol, an alcohol, etc. Some examples of specific nonionic emulsifying agents are: Mannitan monolaurate, sorbitan monomyristate, mannitan monopalmitate, diglycerol monostearate, diethylene glycol mono-undecylate, pentaerythritol monostearate, sorbitol monoarachidate, sorbitan trilaurate, partial palmitic acid esters of polyethylene oxide, ethylene oxide adducts of lauryl alcohol and ethylene oxide adducts of nonyl phenol. The latices can also contain ionic emulsifying agents in minor amounts not essential to emulsion stability.

The amount of emulsifying agent required to stabilize the latex polymer is readily determined for any given latex composition. In general, an amount from about 1 to 10% by weight of the diene polymer is satisfactory.

The latices contain varying amounts of solids and are often characterized by their "solids content" which is expressed as percentage by weight based on the total weight of latex. Latices of any solids content can be employed in the practice of this invention, provided they are not so viscous as to be unworkable. Latices having solids contents of from about 20 to 50% are generally employed.

The diene polymer can be epoxidized with any water-soluble organic peracid. Examples of preferred peracids are peracetic, performic, perphthalic and perbenzoic acids.

The epoxidation product is produced by a low temperature peracid epoxidation of the conjugated diene addition polymer in latex form. In the process of the invention, it is believed that the peracid dissolves in the aqueous phase, diffuses into the dispersed phase where the reaction takes place and the by-product organic acid diffuses back to the continuous phase where it may be removed, if desired. Various ranges of time, temperature and ratio of reagents can be employed depending upon the type of latex and the degree of epoxidation desired. In general, the reaction period is from about 10 to about 300 minutes, the reaction temperature from about 20 to about 60° C. and the ratio of reagents is from about 0.05 to about 0.5 part of peracid per part of polymer by weight.

As seen from the examples, there are various ways in which by-product organic acid can be removed from the reaction product. For example, it can be removed by low-temperature, vacuum distillation with simultaneous replacement of water. Another method is by dialysis. When employing the dialysis technique, the product of the epoxidation reaction is placed in a bag composed of regenerated cellulose film. This bag is placed in a container in contact with slowly circulating tap water for a period of time sufficient to remove the acetic acid. The rate of purification is dependent upon the rate of diffusion of acetic acid through the product latex and through the membrane. This dialysis technique can be made continuous by using small diameter cellulose tubing in contact with water and continuously pumping latex through it. If desired, the organic acid can be merely neutralized and not removed.

The latices of polymers containing epoxide groups combine the properties of a thermosetting epoxide resin with those of latex polymers. They retain the ease of application properties of the latices yet are curable to hard, water and solvent resistant films. The epoxide groupings which are formed in the polymers are not only reactive in a cross-linking sense, but are also capable of reacting under the proper conditions with most substrates, as for example, cellulosics. These facts create broad utility in the textile and paper industries. Some specific uses which have already been found for these latices are as follows: as binders for paper coating clays; as water and solvent resistant internal additives to paper; as binders for nonwoven fabrics; as permanent fabric sizing materials; as binders in the pigment printing and pad dyeing of textile fabrics; as back-sizing materials for carpet and upholstery fabrics; as tire cord adhesives; and as water insensitive wood, paper, fabric and leather adhesives. Still other uses will suggest themselves to the person skilled in the art.

In all of these uses, durability and solvent resistance properties are achieved by treating with an appropriate water-dispersible curing agent. Examples of curing agents are: ethylenediamine, N - (hydroxyethyl) diethylenetriamine; m-xylylene diamine, piperidine, diethylaminopropylamine, m - phenylenediamine, dimethylaminomethylphenol, 4,4'-diaminodiphenyl sulfone, poly (acrylic acid), urea-formaldehyde resin, melamine-formaldehyde resin, diglycolic acid, trimellitic anhydride, promellitic anhydride, maleic anhydride, adipic anhydride, zinc fluoroborate, boron trifluoride, etc. The optimum amount of curing agent can readily be calculated for any latex polymer. Using the same starting materials, hard or soft products may be obtained depending upon the degree of epoxidation and the curing process.

In their various uses the latices of the invention can be used in the dilute form, i.e., as prepared, or they may be concentrated by creaming. One convenient method of creaming is to add a small amount, preferably about 0.5% by weight of solids, of sodium carboxymethylcellulose to a latex. This results in separation of the latex into two phases, an aqueous serum containing a negligible amount of solids and a cream consisting of concentrated latex. The two phases can then be separated by centrifugation and decantation or similar techniques.

What I claim and desire to protect by Letters Patent is:

1. The process of preparing latices of polymers containing epoxide groups comprising adding an organic peracid to a nonionic latex of an unsaturated polymer of a conjugated diene to form oxirane groups in the polymer.

2. The process of claim 1 wherein the polymer is a butadiene-styrene copolymer.

3. The process of claim 1 wherein the polymer is an acrylonitrile-butadiene copolymer.

4. The process of claim 1 wherein the polymer is an α-methylstyrene-butadiene copolymer.

5. The process of claim 1 wherein the organic peracid is peracetic acid.

6. The process of claim 1 wherein by-product organic acid formed during the reaction is removed by dialysis.

7. The process of claim 1 wherein by-product organic acid formed during the reaction is removed by low temperature vacuum distillation.

8. The process of claim 1 wherein by-product organic acid formed during the reaction is neutralized.

References Cited by the Examiner

UNITED STATES PATENTS

| | | | |
|---|---|---|---|
| 2,344,843 | 3/1944 | Wellman | 260—29.7 |
| 2,470,953 | 5/1949 | Robertson et al. | 260—29.7 |
| 2,702,798 | 2/1955 | Burleigh et al. | 260—84.1 |
| 2,829,130 | 4/1958 | Greenspan et al. | 260—94.7 |
| 2,829,135 | 4/1958 | Greenspan et al. | 260—96 |
| 2,875,178 | 2/1959 | Greenspan et al. | 260—85.1 |

FOREIGN PATENTS 54,079  3/1943  Netherlands.

OTHER REFERENCES

Schmidt et al.: "Principles of High-Polymer Theory and Practice," McGraw-Hill, New York, 1948, pages 522–525.

MURRAY TILLMAN, *Primary Examiner*.

LEON J. BERCOVITZ, EUGENE B. WOODRUFF, JACOB ZIEGLER, *Assistant Examiners*.